US012105723B2

(12) United States Patent
Hayden et al.

(10) Patent No.: US 12,105,723 B2
(45) Date of Patent: Oct. 1, 2024

(54) POINT IN TIME REPRESENTATION FOR ORGANIZATIONAL HIERARCHY

(71) Applicant: S&P Global Inc., New York, NY (US)

(72) Inventors: Jonathan Edward Hoyt Hayden, Westford, MA (US); Michael Albert Vezza, Weston, MA (US); James Ryan Psota, Cambridge, MA (US)

(73) Assignee: S&P Global Inc., New York, NY (US)

( * ) Notice: Subject to any disclaimer, the term of this patent is extended or adjusted under 35 U.S.C. 154(b) by 59 days.

(21) Appl. No.: 17/457,352

(22) Filed: Dec. 2, 2021

(65) Prior Publication Data

US 2023/0177061 A1 Jun. 8, 2023

(51) Int. Cl.
*G06F 16/248* (2019.01)
*G06F 7/08* (2006.01)
*G06F 16/22* (2019.01)
*G06F 16/28* (2019.01)
*G06F 3/04847* (2022.01)

(52) U.S. Cl.
CPC .............. *G06F 16/248* (2019.01); *G06F 7/08* (2013.01); *G06F 16/2246* (2019.01); *G06F 16/282* (2019.01); *G06F 3/04847* (2013.01)

(58) Field of Classification Search
None
See application file for complete search history.

(56) References Cited

U.S. PATENT DOCUMENTS

| | | | |
|---|---|---|---|
| 2005/0137899 A1* | 6/2005 | Davies | G06Q 10/0637 705/1.1 |
| 2008/0235249 A1* | 9/2008 | Stephens | G06Q 10/06 |
| 2008/0256099 A1* | 10/2008 | Chodorov | G06Q 10/10 |

OTHER PUBLICATIONS

Takashi, "Method of and apparatus for displaying personal connection information, and computer product", 2012 (Year: 2012) (Year : 2012).*
Kluwer, "Capital Changes Historical & Daily", 2014 (Year: 2014).*

* cited by examiner

*Primary Examiner* — Dawaune A Conyers
(74) *Attorney, Agent, or Firm* — Yee & Associates, P.C.

(57) ABSTRACT

A method for point-in-time visualization system management is provided. The method includes receiving organizational structure queries from user interfaces, creating organizational hierarchy database queries from the organizational structure query, and converting the results of those queries into entity change parameters lists and organizational tree structures for display on the user interface. The displayed organizational tree structure and entity change parameters can be filtered via controls available on the user interface.

12 Claims, 10 Drawing Sheets

POINT IN TIME REPRESENTATION FOR ORGANIZATIONAL HIERARCHY

BACKGROUND INFORMATION

1. Field

The present disclosure relates generally to an improved computer system and in particular, to a method and system for improved Point-in-Time Visualization.

2. Background

Organizations are fluid and can change over time. Organizational structures play a key factor in ownership of goods and materials especially when multiple organizations merge or are acquired over time. Depending on the age of inventory, supply chain professionals may have to search back through years of records to establish a chain of title or ownership of goods and materials. Understanding the organizational hierarchy at any given point in time of the history of a company can be critical for the supply chain professional.

Therefore, it would be desirable to have a method and apparatus that take into account at least some of the issues discussed above, as well as other possible issues.

SUMMARY

An illustrative embodiment provides a computer-implemented method for an improved Point-in-Time Visualization system. The method comprises receiving an organizational structure query from a user interface. The query is processed, and a number of historical organizational hierarchy records are retrieved from a historical organizational hierarchy database. The retrieved historical organizational hierarchy records are sorted. Once sorted the historical organizational hierarchy records are organized into an organizational tree structure. A number of entity change parameters are selected from the sorted organizational hierarchy records. The organizational tree structure and the entity change parameters are then returned to the user interface and displayed on the user interface.

Another illustrative embodiment provides a system for supply chain management. The system comprises a bus system, a storage device connected to the bus system, wherein the storage device stores program instructions, and a number of processors connected to the bus system, wherein the number of processors execute the program instructions to: receive an organizational structure query from a user interface; retrieve a number of organizational hierarchy records from a historical organizational hierarchy database in response to the query; sort the organizational hierarchy records; determine an organizational tree structure for the organizational hierarchy records; determine a number of entity change parameters for the organizational hierarchy records; display the organizational tree structure on a user interface; and display the entity change parameters on the user interface.

Another illustrative embodiment provides a computer program product for supply chain management. The computer program product comprises a computer-readable storage medium having program instructions embodied thereon to perform the steps of: receiving an organizational structure query from a user interface; retrieving a number of organizational hierarchy records from a historical organizational hierarchy database in response to the query; sorting the organizational hierarchy records; determining an organizational tree structure for the organizational hierarchy records; determining a number of entity change parameters for the organizational hierarchy records; displaying the organizational tree structure on a user interface; and displaying the entity change parameters on the user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that organizational structures play a key factor in ownership of goods and materials especially when multiple organizations merge or are acquired over time. Depending on the age of inventory, supply chain professionals may have to search back through years of records to establish a chain of title or ownership of goods and materials. Understanding the organizational hierarchy at any given point in time of the history of a company, can be critical for the supply chain professional.

The illustrative embodiments also recognize and take into account that it may be critical for procurement or supply chain organizations to understand their structures at the time purchases of materials, supplies, and goods are made. It is also beneficial for these organizations to understand the structure of their organizations at the time similar historical purchases were made. Additionally, business-to-business service providers would have a need to understand the organizational structure of their client's business and the business hierarchy at the time purchases were made.

The illustrative embodiments provide a mechanism that allows a user interface to display an organizational hierarchy tree, linked to entity change parameters, and optionally correlated to other business data sets. The correlation allows a supply chain professional to associate other data sets to the hierarchical state of the organization at the time the data set was created.

Figure 1:
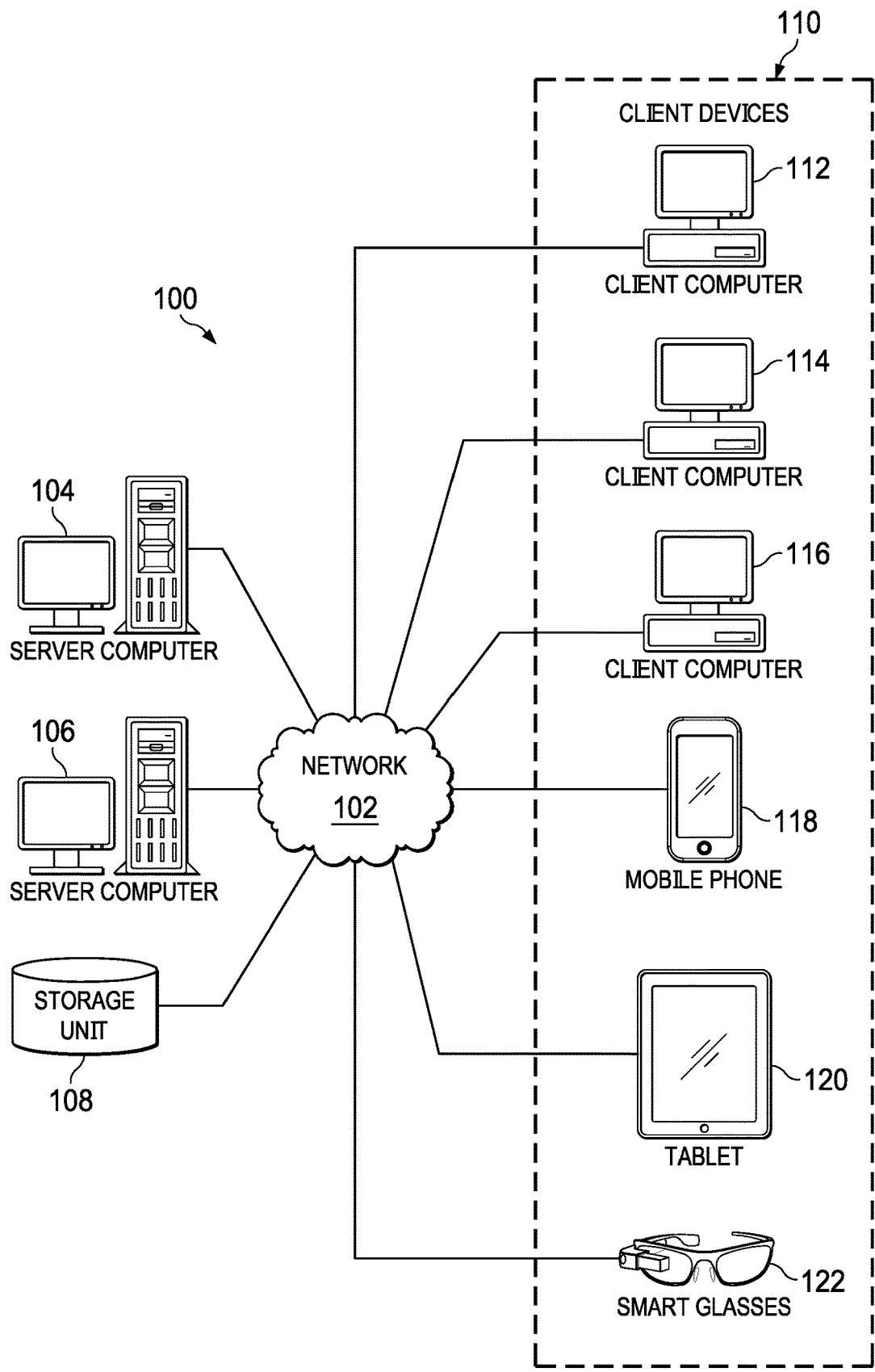
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
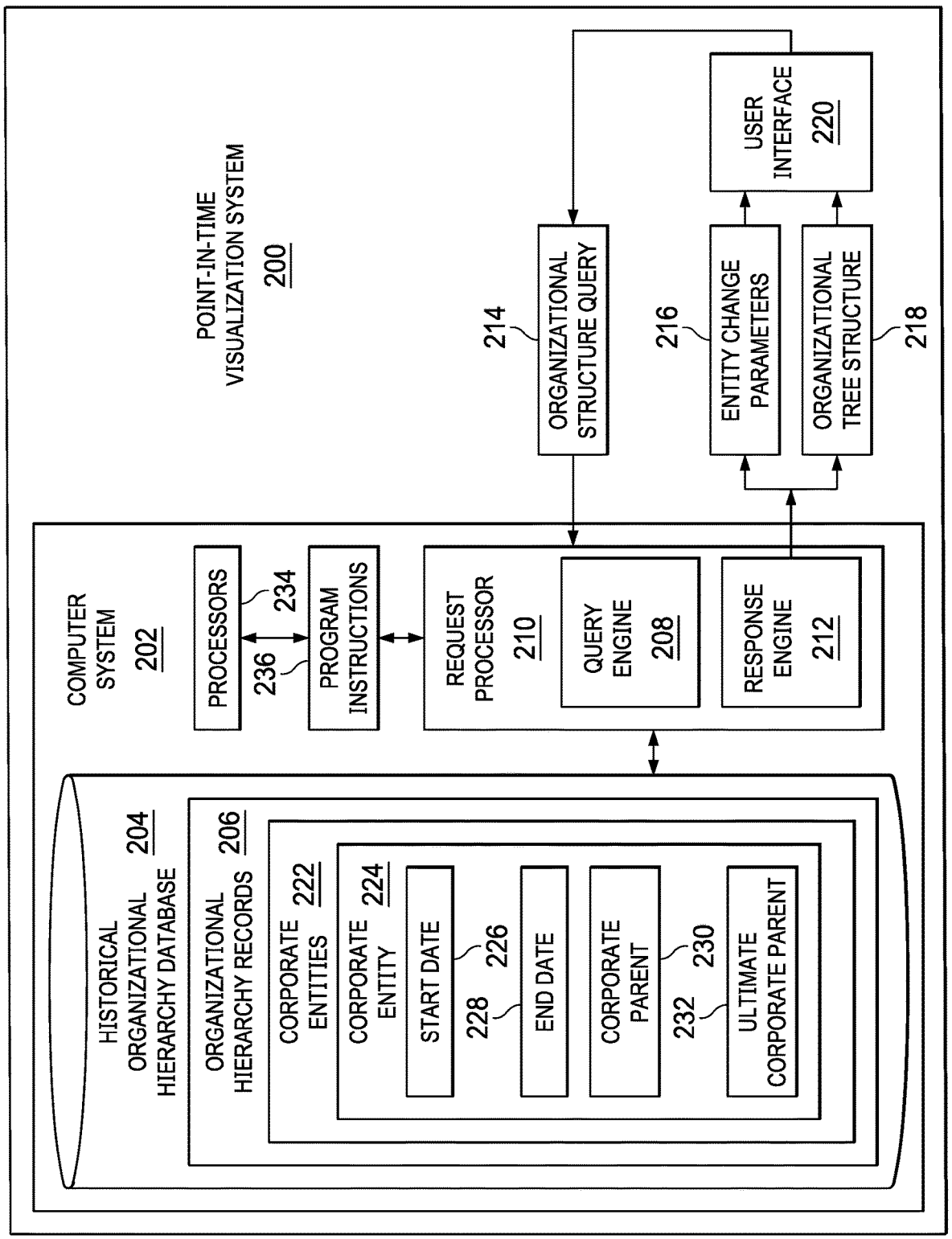
FIG. 2 is an illustration of a block diagram of an supply chain management environment in accordance with an illustrative embodiment.

Turning to FIG. 2, a block diagram of a supply chain system is depicted in accordance with an illustrative embodiment. Point-in-Time Visualization system 200 might be implemented in network data processing system 100 in FIG. 1.

Point-in-Time Visualization system 200 comprises computer system 202 and user interface 220. Computer system 202 is a physical hardware system and may include one or more data processing systems. When more than one data processing system is present in computer system 202, those data processing systems are in communication with each other using a communications medium. The communications medium can be a network. The data processing systems can be selected from at least one of a computer, a server computer, a tablet computer, or some other suitable data processing system.

As depicted, computer system 202 includes a number of processors 234 that are capable of executing program instructions 236 implementing processes in the illustrative examples. As used herein a processor unit in the number of processors 234 is a hardware device and is comprised of hardware circuits such as those on an integrated circuit that respond and process instructions and program code that operate a computer. When a number of processors 234 execute program instructions 236 for a process, the number of processors 234 is one or more processors that can be on the same computer or on different computers. In other words, the process can be distributed between processors on the same or different computers in a computer system. Further, the number of processors 234 can be of the same type or different type of processors. For example, a number of processors can be selected from at least one of a single core processor, a dual-core processor, a multi-processor core, a general-purpose central processing unit (CPU), a graphics processing unit (GPU), a digital signal processor (DSP), or some other type of processor unit.

Within the computer system 202 are request processor 210 and historical organizational hierarchy database 204. The Request Processor 210 manages query engine 208 and response engine 212.

In the illustrative example, request processor 210 can be implemented in software, hardware, firmware, or a combination thereof. When software is used, the operations performed by request processor 210 can be implemented in program instructions configured to run on hardware, such as a processor unit. When firmware is used, the operations performed by request processor 210 can be implemented in program instructions and data and stored in persistent memory to run on a processor unit. When hardware is employed, the hardware can include circuits that operate to perform the operations in request processor 210.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

User interface 220 generates organizational structure query 214. The user interface 220 sends organizational structure query 214 to query engine 208 in request processor 210. Query engine 208 processes organizational structure query 214 by making a record retrieval request based on organizational structure query 214 from historical organizational hierarchy database 204. Historical organizational hierarchy database 204 retrieves the correct organizational hierarchy records 206 in response to organizational structure query 214 and send the resulting records to response engine 212 in request processor 210. Response engine 212 sorts organizational hierarchy records 206 into organizational tree structure 218 by first identifying corporate entities 222 within the organizational hierarchy records 206. Next, response engine 212 extracts corporate data for a corporate entity 224 from corporate entities 222 and orders corporate entity 224 by ultimate corporate parent 232, corporate parent 230, and start date 226. Response engine 212 also determines entity change parameters 216, based on business rules and selected criteria from organizational hierarchy records 206. Entity change parameters 216 are determined by extracting entity change parameters 216 from the retrieved organizational hierarchy records 206. In an illustrative embodiment, the business rules to extract entity change parameters 216 from organizational hierarchy records 206 could be defined as: the addition of a new entity to the corporate hierarchy, the removal of an existing entity from the corporate hierarchy, or the repositioning of an entity within the corporate hierarchy. The number of entity change parameters 216 may comprise corporate entity 224, a start date 226, an end date 228, a corporate parent 230, or an ultimate corporate parent 232.

Request processor 210 returns organizational tree structure 218 and entity change parameters 216 to user interface 220. User interface 220 displays received organizational tree structure 218 and entity change parameters 216 for the end user (see FIGS. 4-8).

Request processor 210 might comprise one or more processors. As used herein a processor unit is a hardware device and is comprised of hardware circuits such as those on an integrated circuit that respond and process instructions and program code that operate a computer. When request processor 210 executes instructions for a process, one or more processors can be on the same computer or on different computers in computer system 202. In other words, the process can be distributed between processors on the same or different computers in computer system 202. Furthermore, one or more processors comprising request processor 210 can be of the same type or different type of processors. For example, request processor 210 can be selected from at least one of a single core processor, a dual-core processor, a multi-processor core, a general-purpose central processing unit (CPU), a graphics processing unit (GPU), a digital signal processor (DSP), or some other type of processor.

Figure 3:
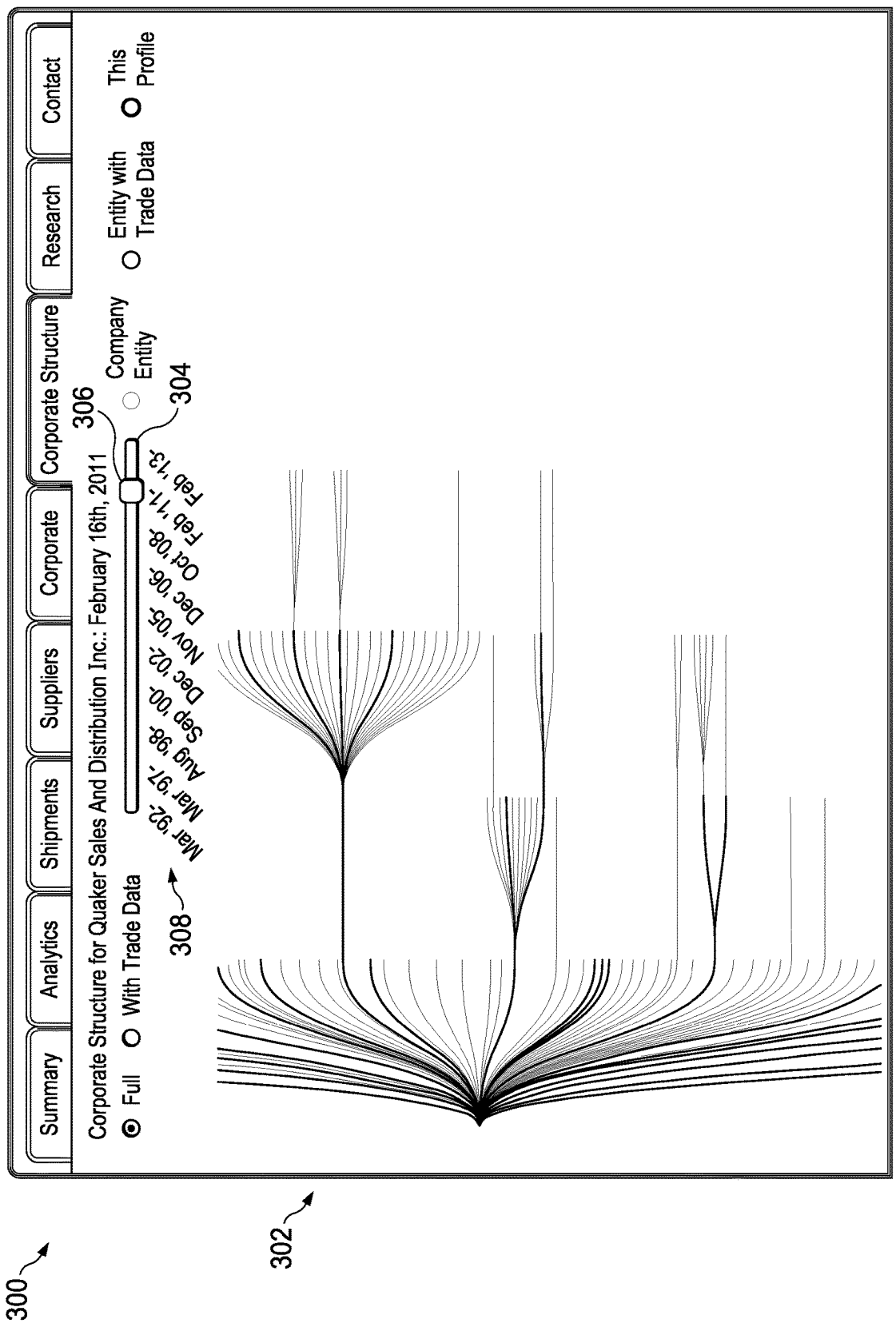
FIG. 3 is an illustration of a user interface display in accordance with an illustrative embodiment.

FIG. 3 depicts an example view of a user interface in accordance with an illustrative embodiment. User interface 300 may be an example of user interface 220 in FIG. 2. The organizational tree structure 302 is displayed at the bottom of the user interface. The entity change parameters are displayed on the user interface, above organizational tree structure 302, in which a graphical control in the form of slider bar 304 comprises month and year formatted dates as stop point 308 along the slider bar. Indicator 306 can be moved to stop point 308 based on the entity change parameters in slider bar 304 which filters available records in organizational tree structure 302.

In an illustrative embodiment branches of organizational tree structure 302 may have a second business data set correlated to them.

Figure 4:
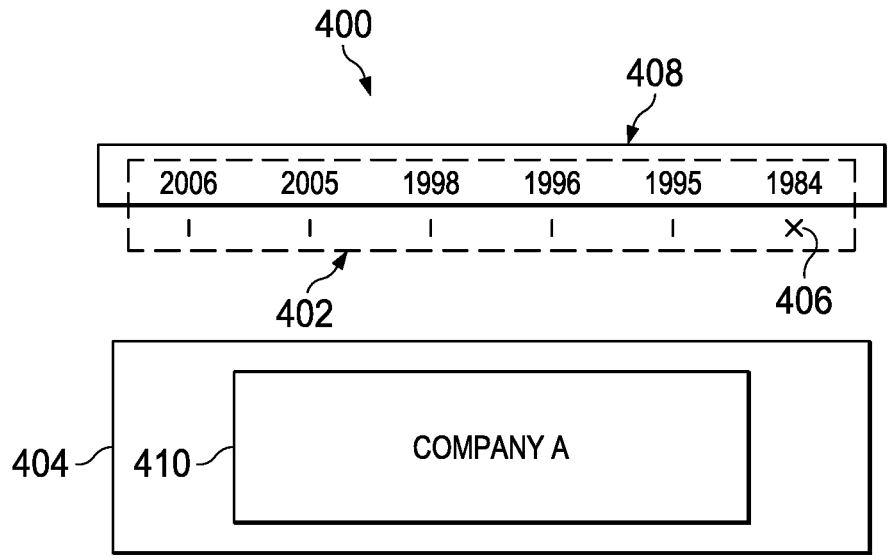
FIG. 4 is an illustration of a user interface display in accordance with an illustrative embodiment showing the beginning state of how the display changes based on the operation of the slider bar.

FIG. 4 is an illustration of a user interface display in accordance with an illustrative embodiment showing the beginning state of how the display changes based on the operation of the slider bar such as slider bar 304 in FIG. 3. The organizational tree structure 404 at a particular point in time is displayed at the bottom of the user interface. The point in time selected is determined by the selected stop point 408 based on the position of indicator 406 on slider bar 402. The entity change parameters are displayed on the user interface, above the organizational tree structure 404 graphically as slider bar 402 with years as stop point 408 and the filtered organizational tree structure 404 records for the selected stop point 408 being displayed.

In an illustrative embodiment, organizational tree structure 404 is shown graphically starting at the ultimate parent entity node 410. For the selected stop point 408, no other records exist, so no other records are displayed.

Figure 5:
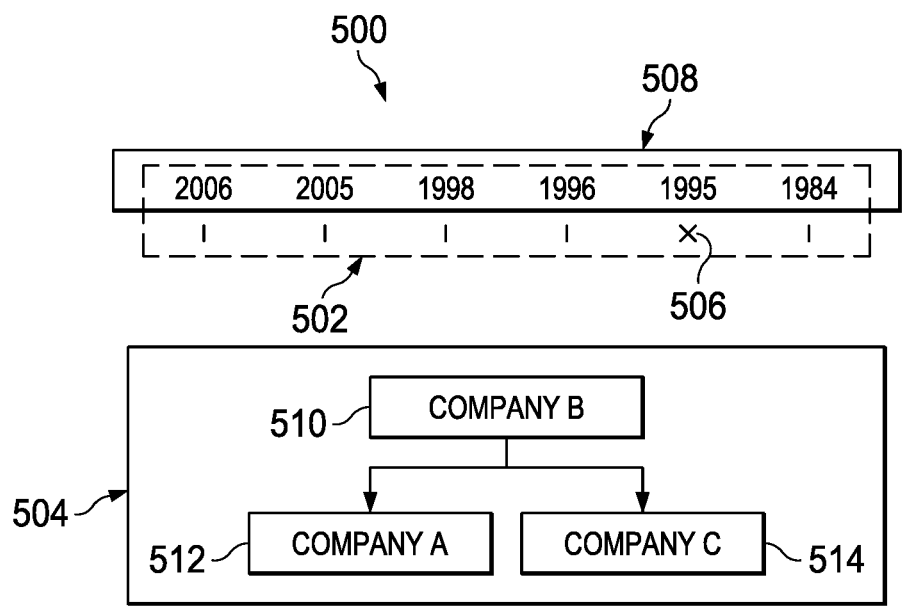
FIG. 5 is an illustration of a user interface display in accordance with an illustrative embodiment showing how the display changes based on the operation of the slider bar to a different point in time.

FIG. 5 is an illustration of a user interface display in accordance with an illustrative embodiment showing how the display changes based on the operation of the slider bar to a different point in time. The organizational tree structure 504 at a particular point in time is displayed at the bottom of the user interface. The point in time selected is determined by the selected stop point 508 based on position of indicator 506 on slider bar 502. The entity change parameters are displayed on the user interface, above the organizational tree structure 504 graphically as slider bar 502 with years as stop point 508 and the filtered organizational tree structure 504 records for the stop point 508 selected being displayed. The changes in the corporate entities within the organization are displayed as organizational tree structure 504 based on the change in position of indicator 506 from FIG. 4 to FIG. 5.

In an illustrative embodiment, organizational tree structure 504 is shown graphically starting at the ultimate parent entity node 510. For the selected stop point 508, there are additional records which are shown as entity nodes 512 and 514 connected to parent entity node 510. This displays node 510 as both the ultimate parent entity and a parent entity for the other entity records displayed.

Figure 6:
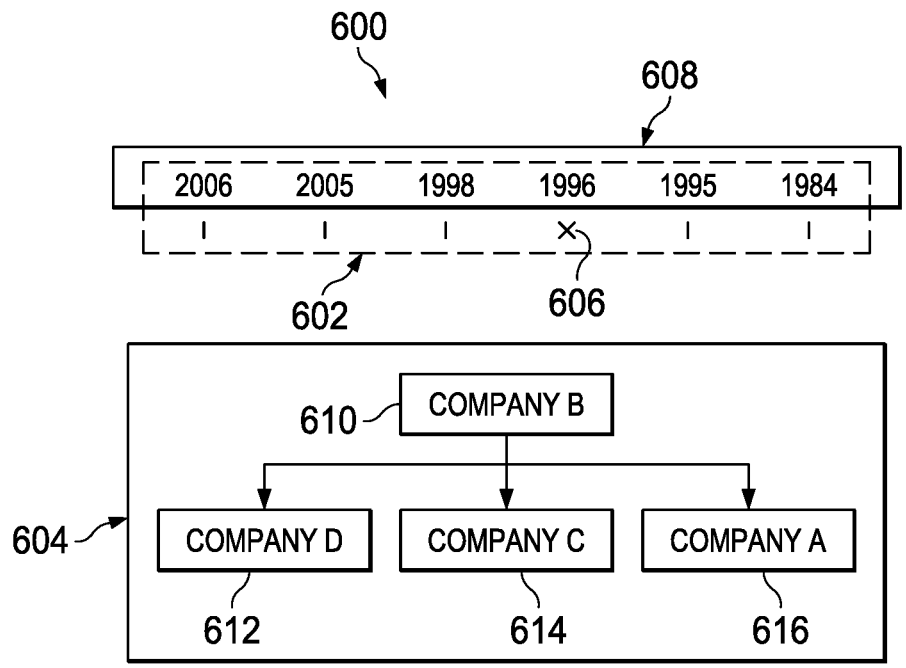
FIG. 6 is an illustration of a user interface display in accordance with an illustrative embodiment showing how the display changes based on the operation of the slider bar to a different point in time.

FIG. 6 is an illustration of a user interface display in accordance with an illustrative embodiment showing how the display changes based on the operation of the slider bar to a different point in time. The organizational tree structure 604 at a particular point in time is displayed at the bottom of the user interface. The point in time selected is determined by the selected stop point 608 based on position of indicator 606 on slider bar 602. The entity change parameters are displayed on the user interface, above the organizational tree structure 604 graphically as slider bar 602 with years as stop point 608 and the filtered organizational tree structure 604 records for the stop point 608 selected being displayed. The changes in the corporate entities within the organization are displayed as organizational tree structure 604 based on the change in position of indicator 606 from FIG. 5 to FIG. 6.

In an illustrative embodiment, organizational tree structure 604 is shown graphically starting at the ultimate parent entity node 610. For the selected stop point 608, there are additional records which are shown as entity nodes 612, 614, and 616 connected to parent entity node 610. This displays node 610 as both the ultimate parent entity and a parent entity for the other entity records displayed.

Figure 7:
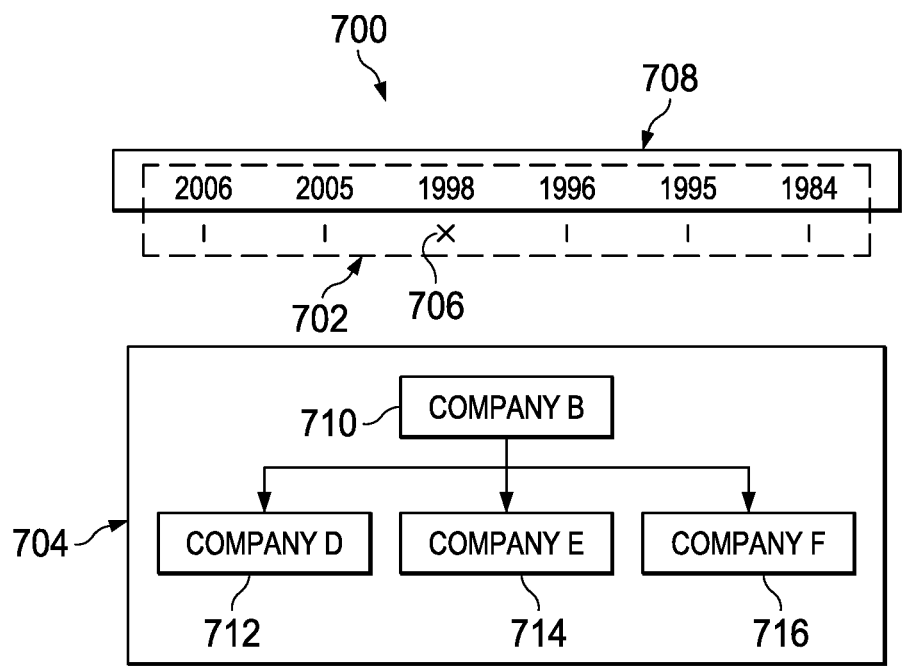
FIG. 7 is an illustration of a user interface display in accordance with an illustrative embodiment showing the beginning state of how the display changes based on the operation of the slider bar to a different point in time.

FIG. 7 is an illustration of a user interface display in accordance with an illustrative embodiment showing the beginning state of how the display changes based on the operation of the slider bar to a different point in time. The organizational tree structure 704 at a particular point in time is displayed at the bottom of the user interface. The point in time selected is determined by the selected stop point 708 based on position of indicator 706 on slider bar 702. The entity change parameters are displayed on the user interface, above the organizational tree structure 704 graphically as slider bar 702 with years as stop point 708 and the filtered organizational tree structure 704 records for the stop point 708 selected being displayed. The changes in the corporate entities within the organization are displayed as organizational tree structure 704 based on the change in position of indicator 706 from FIG. 6 to FIG. 7.

In an illustrative embodiment, organizational tree structure 704 is shown graphically starting at the ultimate parent entity node 710. For the selected stop point 708, there are additional records which are shown as entity nodes 712, 714, and 716 connected to parent entity node 710. This displays node 710 as both the ultimate parent entity and a parent entity for the other entity records displayed. Entity nodes 714 and 716 are different entities than displayed in FIG. 6, based on addition, removal, or repositioning of entities within the organization between the time of selected stop point 608 shown by indicator 606 and the time of selected stop point 708 shown by indicator 706.

Figure 8:
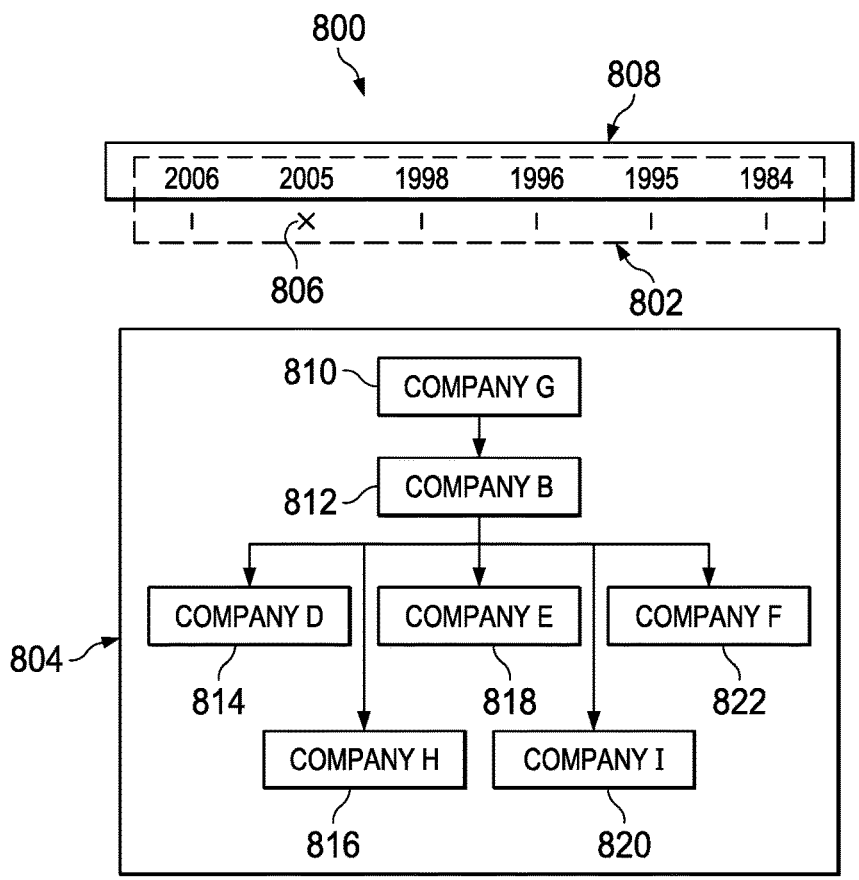
FIG. 8 is an illustration of a user interface display in accordance with an illustrative embodiment showing how the display changes based on the operation of the slider bar to a different point in time.

FIG. 8 is an illustration of a user interface display in accordance with an illustrative embodiment showing how the display changes based on the operation of the slider bar to a different point in time. The organizational tree structure 804 at a particular point in time is displayed at the bottom of the user interface. The point in time selected is determined by the selected stop point 808 based on position of indicator 806 on slider bar 802. The entity change parameters are displayed on the user interface, above the organizational tree structure 804 graphically as slider bar 802 with years as stop point 808 and the filtered organizational tree structure 804 records for the stop point 808 selected being displayed. The changes in the corporate entities within the organization are displayed as organizational tree structure 804 based on the change in position of indicator 806 from FIG. 7 to FIG. 8.

In an illustrative embodiment, organizational tree structure 804 is shown graphically starting at the ultimate parent entity node 810. For the selected stop point 808, there are additional records which are shown as entity nodes 812, 814, 816, 818, 820, and 822 connected to ultimate parent entity node 810. This display shows node 810 as the ultimate parent entity for the organization. Node 812 is the parent entity for the other entity records displayed (represented by nodes 814, 816, 818, 820, and 822). The connections shown between entity nodes 814, 816, 818, 820, and 822 and parent entity node 812, then show the connection as node 810 being the ultimate parent entity for all displayed records. Entity nodes displayed are different entities than displayed in previous FIG. 4, 5, 6, or 7 based on addition, removal, or repositioning of entities within the organization between the time represented by FIG. 8 and the times represented by FIGS. 4-7.

Figure 9:
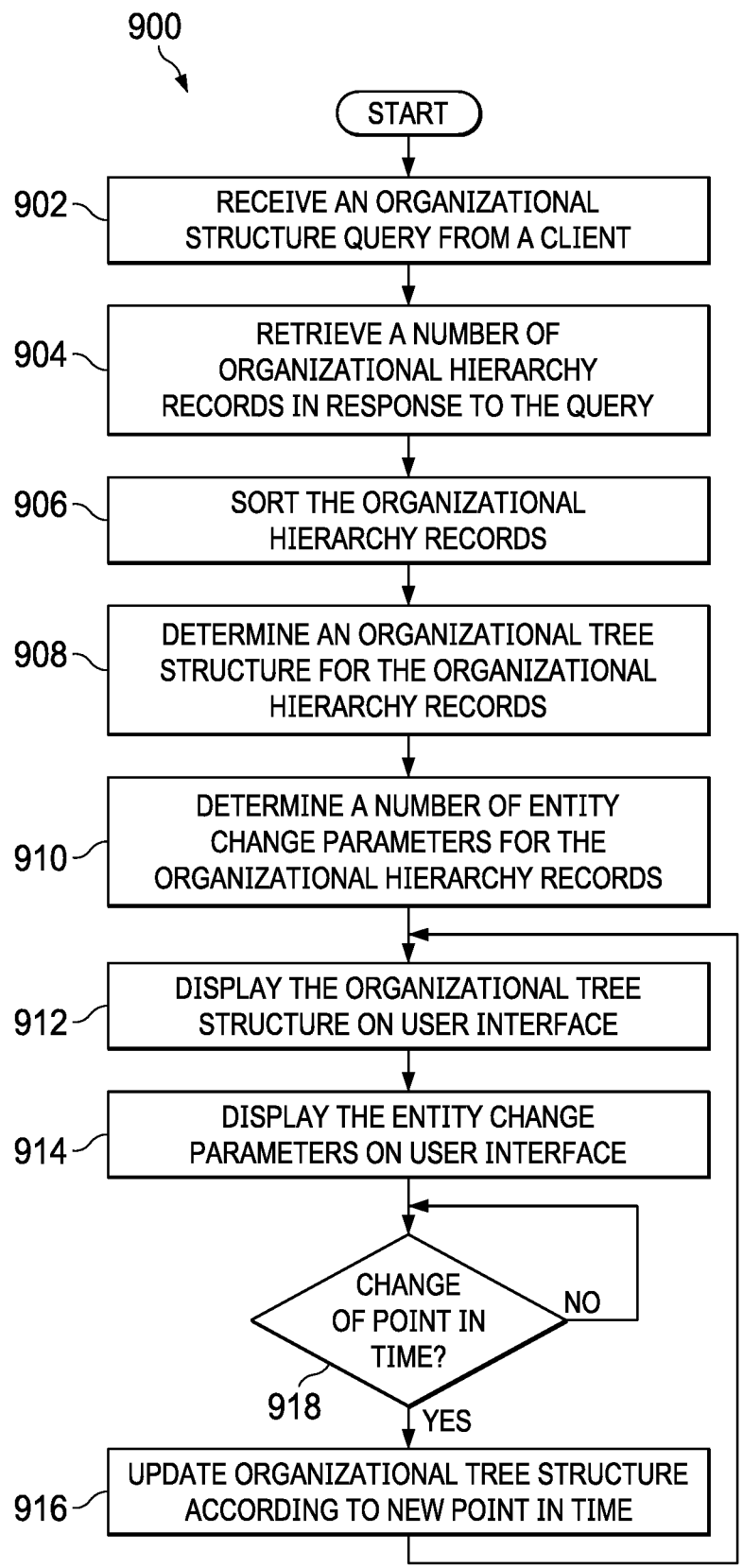
FIG. 9 depicts a flowchart illustrating processing of an organizational structure query from user interface request to user interface display in accordance with an illustrative embodiment.

FIG. 9 depicts a flowchart for a process of managing organizational query requests through a Point-in-Time Visualization system in accordance with an illustrative embodiment. The process in FIG. 9 can be implemented in hardware, software, or both. When implemented in software, the process can take the form of program code that is run by one of more processors located in one or more hardware devices in one or more computer systems. Process 900 might be implemented in Point-in-Time Visualization system 200 shown in FIG. 2.

Process 900 begins by receiving an organizational structure query from a user interface of the system initiating an organizational structure query (step 902).

The organizational structure query is used to retrieve a number of organizational hierarchy records from a historical organizational hierarchy records repository or database in response to the query (step 904). The organizational hierarchy records may be correlated to a business data set.

The retrieved organizational hierarchy records are then sorted in the request processor (step 906).

The request processor takes the sorted organizational hierarchy records and determines an organizational tree structure for the records (step 908).

Additionally, the request processor determines a number of entity change parameters by extracting them from the retrieved number of organizational hierarchy records (step 910).

In an illustrative embodiment, the business rules to extract entity change parameters from the number of organizational hierarchy records could be defined as: the addition of a new entity to the corporate hierarchy, the removal of an existing entity from the corporate hierarchy, or the repositioning of an entity within the corporate hierarchy. The number of entity change parameters may comprise an entity, a start date, an end date, a parent entity, or an ultimate parent entity.

The response engine in the request processor returns the organizational tree structure to the user interface, which in turn displays the received organizational tree structure within the user interface like shown by FIGS. 3-8 (step 912). The organizational tree structure may be represented graphically when displayed in the user interface.

Similarly, the response engine in the request processor returns the entity change parameters to the user interface, which in turn displays the received entity change parameters within the user interface (step 914). The entity change parameters may be represented graphically when displayed in the user interface. The entity change parameters may be represented graphically by a slider, a dial, a scrollbar, a number of buttons, or a wheel. The graphical representation of the number of entity change parameters may filter the display of the organizational tree structure to a particular point in time.

The user may request a change to the point in time being observed (step 918). This request may be submitted through the user interface by adjusting the value of the entity change parameter currently being observed. In response to a request to change the displayed point in time, the selected records in the organizational tree structure can be filtered or updated to reflect the point in time being requested (step 916). The updated set of selected organizational tree structure records can then be displayed on the user interface (step 912).

Process 900 then continues in response to changes in user selection of points in time in the interface or until the user terminates use of the system.

Figure 10:
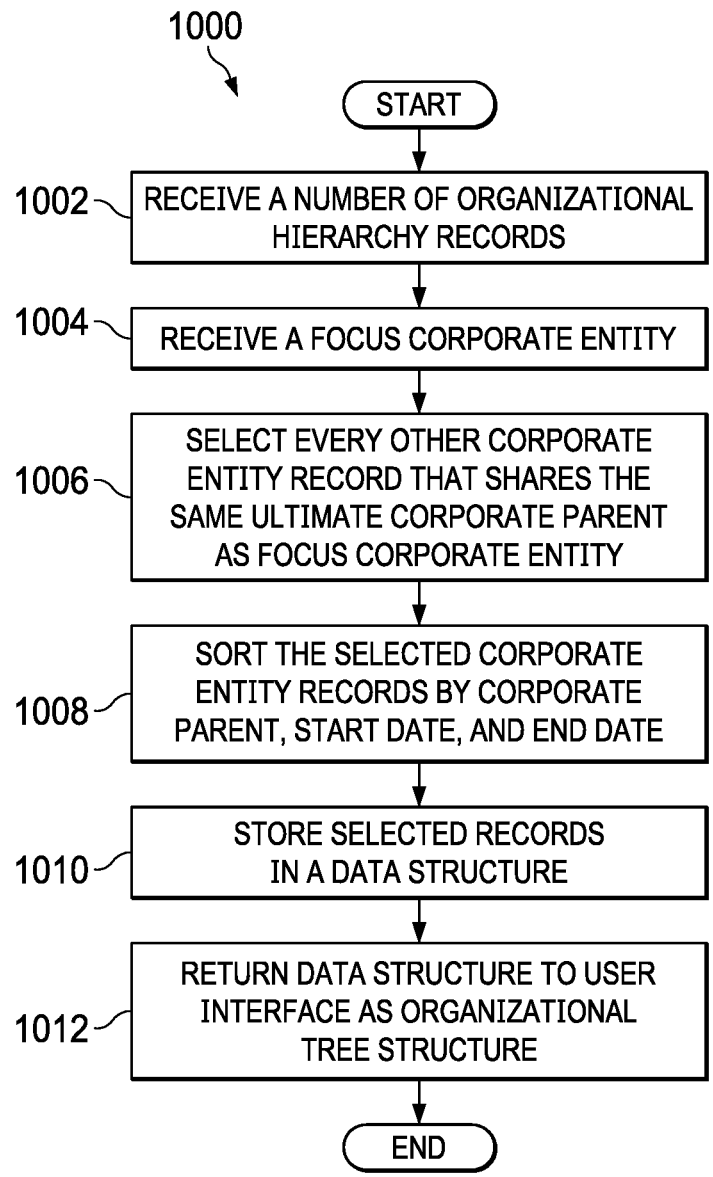
FIG. 10 depicts a flowchart illustrating a process for building an organizational hierarchy tree in accordance with an illustrative embodiment.

FIG. 10 depicts a flowchart for a process of managing organizational query requests through a Point-in-Time Visualization system in accordance with an illustrative embodiment. The process in FIG. 10 can be implemented in hardware, software, or both. When implemented in software, the process can take the form of program code that is run by one of more processors located in one or more hardware devices in one or more computer systems. Process 1000 might be implemented in Point-in-Time Visualization system 200 shown in FIG. 2.

Process 1000 begins by receiving a number of organizational hierarchy records as the results from submitting a query to the Historical Organizational Hierarchy database (step 1002).

The organizational structure query is used to determine a focus corporate entity (step 1004). The focus corporate entity may also be received directly from the user interface.

The number of organizational hierarchy records are then queried to select all corporate entity records that have the same value for ultimate corporate parent as the focus corporate entity (step 1006). In an illustrative embodiment, the organizational hierarchy records are based on a corporation hierarchy structure, where one corporate entity is owned by another and all corporate entities in a particular set of organizational hierarchy records all have the same ultimate corporate parent. In another illustrative embodiment, the organizational hierarchy records may be based on a supply chain hierarchy where the ultimate corporate parent would be a manufacturer. As the goods move through the supply chain, each entity taking possession could be a corporate entity. Each transaction to move the goods could be a link between the entities taking possession of the goods at different points in time while the goods move from manufacturer to retailer or consumer. Start date could be the date of purchase transaction. End date could be the date of the sale transaction.

The selected corporate entity records are then sorted by corporate parent, start date, and end date to build a tree like structure (step 1008).

The sorted corporate entity records are then stored in a data structure (step 1010).

The data structure containing the sorted corporate entity records is then returned to the user interface that initiated the organizational structure query (step 1012).

Process 1000 then ends.

Figure 11:
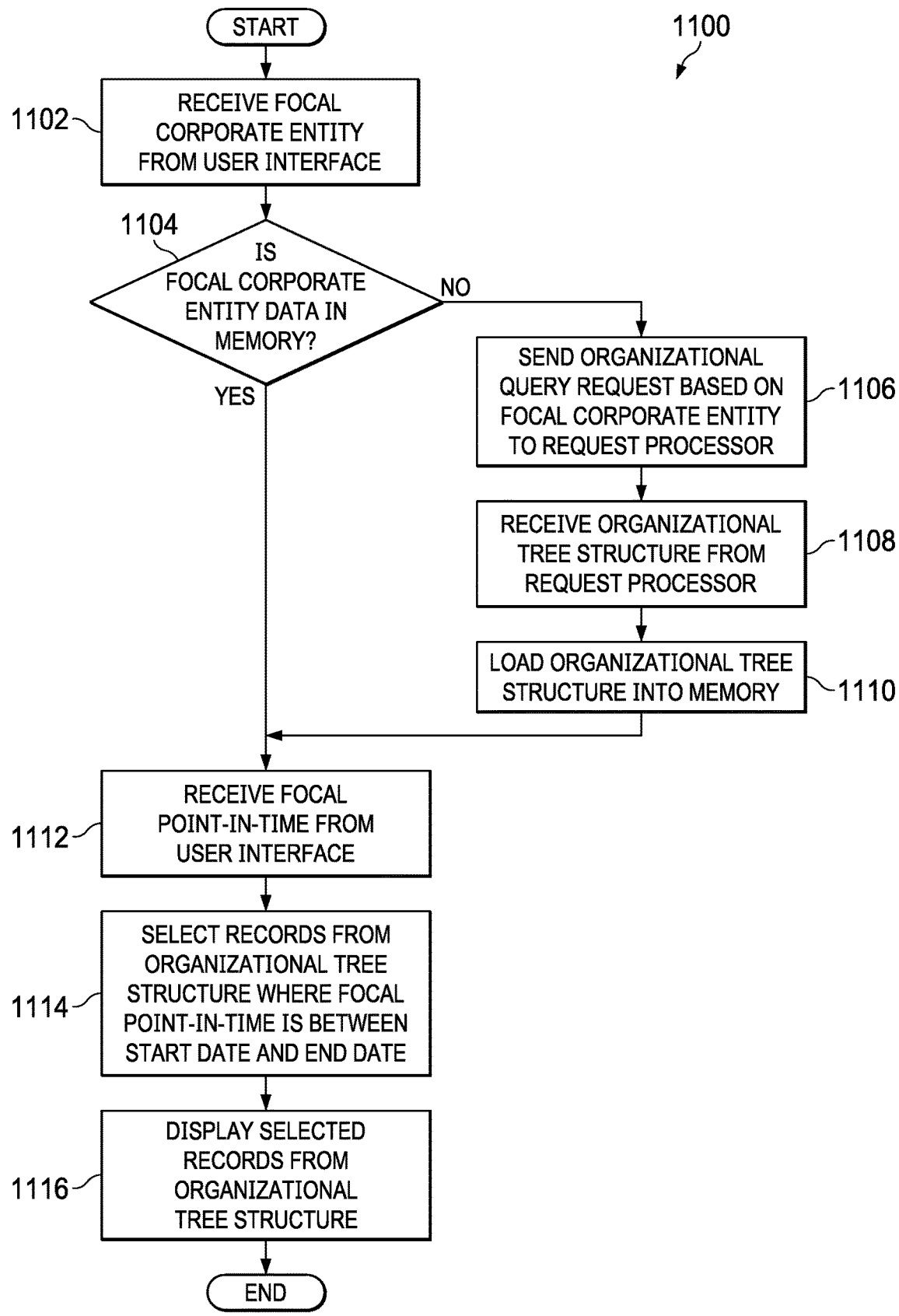
FIG. 11 depicts a flowchart illustrating a process for filtering the displayed data on the user interface in accordance with an illustrative embodiment.

FIG. 11 depicts a flowchart for operation of the user interface on the browser in accordance with an illustrative embodiment. The process in FIG. 11 can be implemented in hardware, software, or both. When implemented in software, the process can take the form of program code that is run by one of more processors located in one or more hardware devices in one or more computer systems. Process 1100 might be implemented in Point-in-Time Visualization system 200 shown in FIG. 2.

Process 1100 begins by the user interface receiving a selection of a focal corporate entity (step 1102).

The user interface then queries the organizational tree structure in memory, if present, to determine if the focal corporate entity is currently present in memory (step 1104).

If the focal corporate entity is not in memory, or if there is not an existing organizational tree structure in memory, then the user interface sends an organizational query request based on the focal corporate entity to the request processor (step 1106).

The user interface receives an organizational tree structure from the request processor (step 1108).

The user interface then loads the organizational tree structure received into memory (step 1110). In an illustrative embodiment, user interface could be an application and would load the organizational tree structure into its application memory. In another illustrative embodiment, user interface could be a web-based application and would load the organizational tree structure into the web browser's memory.

If the focal corporate entity data is in memory, or the organizational tree structure in memory has been refreshed to contain the focal corporate entity data, then user interface receives a selected focal point-in time (step 1112).

The organizational tree structure in memory is then queried to select records where the selected focal point-in-time falls between the start date and the end date of the records (step 1114).

The selected organizational tree structure records are then displayed on the user interface (step 1116).

Process 1100 then ends.

Figure 12:
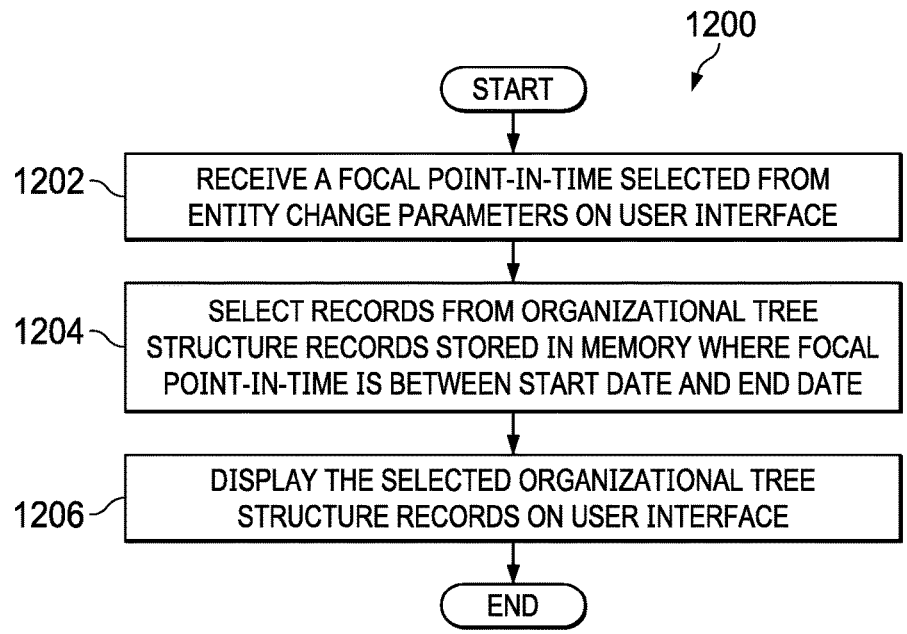
FIG. 12 depicts a flowchart illustrating the operation of the user interface on the browser in accordance with an illustrative embodiment.

FIG. 12 depicts a flowchart for filtering the displayed organizational tree structure on the user interface in accordance with an illustrative embodiment. The process in FIG. 12 can be implemented in hardware, software, or both. When implemented in software, the process can take the form of program code that is run by one of more processors located in one or more hardware devices in one or more computer systems. Process 1200 might be implemented in Point-in-Time Visualization system 200 shown in FIG. 2.

Process 1200 begins by user interface receiving a focal point-in-time, based on the entity change parameters available (step 1202).

The user interface then queries the organizational tree structure records stored in memory to select records where the focal point-in-time received is between the start date and the end date of the records (step 1204).

The selected organizational tree structure records are then displayed on the user interface (step 1206).

Process 1200 then ends.

Figure 13:
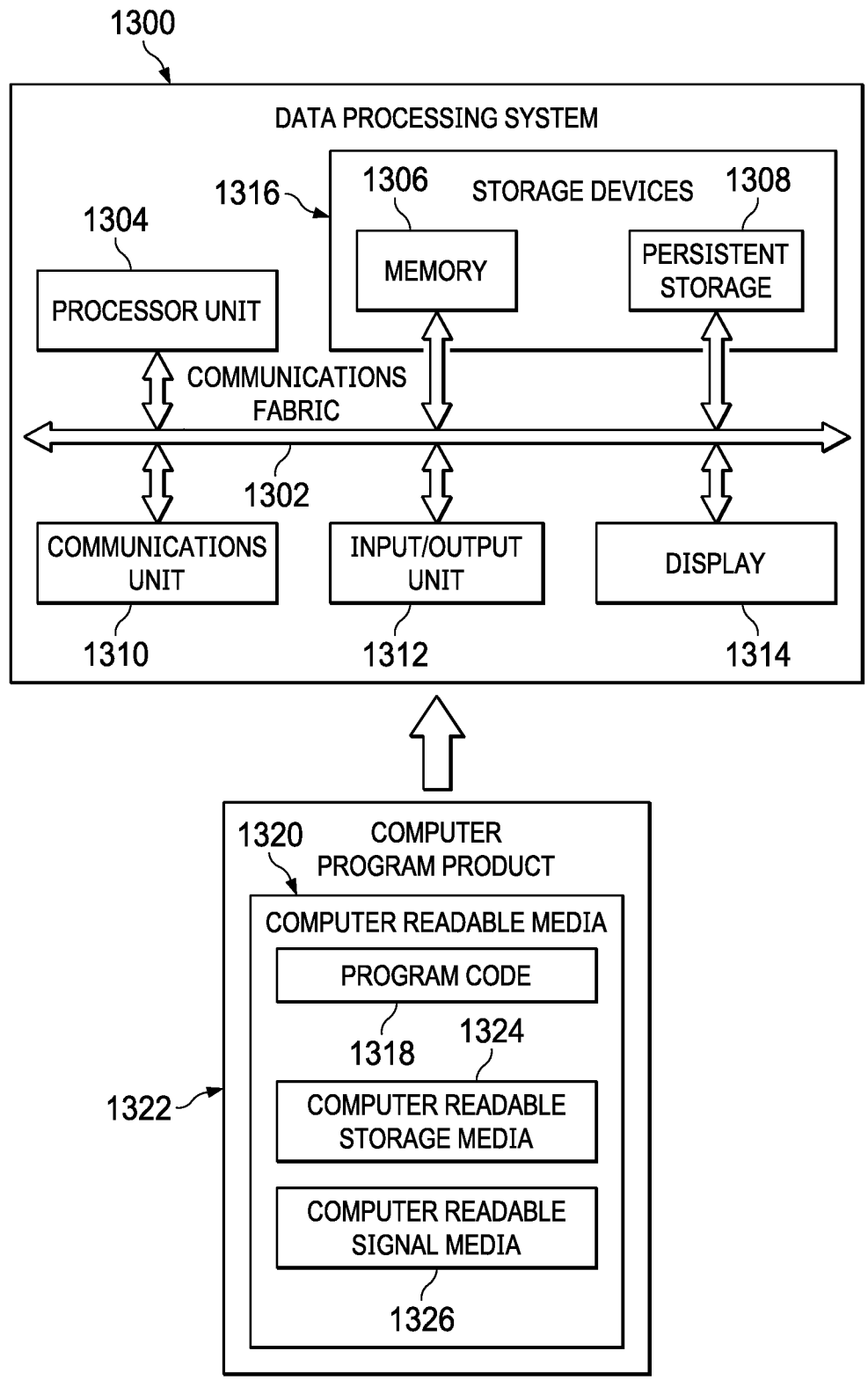
FIG. 13 is an illustration of a block diagram of a data processing system in accordance with an illustrative embodiment.

Turning now to FIG. 13, an illustration of a block diagram of a data processing system is depicted in accordance with an illustrative embodiment. Data processing system 1300 may be used to implement one or more computers shown in FIG. 1 (e.g., client devices 110 and server computers 104, 106) and Point-in-Time Visualization system 200 in FIG. 2. In this illustrative example, data processing system 1300 includes communications framework 1302, which provides communications between processor unit 1304, memory 1306, persistent storage 1308, communications unit 1310, input/output unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation. In an embodiment, processor unit 1304 comprises one or more conventional general-purpose central processing units (CPUs). In an alternate embodiment, processor unit 1304 comprises one or more graphical processing units (CPUs).

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308. Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer-usable program code, or computer-readable program code that may be read and executed by a processor in processor unit 1304. The program code in the different embodiments may be embodied on different physical or computer-readable storage media, such as memory 1306 or persistent storage 1308.

Program code 1318 is located in a functional form on computer-readable media 1320 that is selectively removable and may be loaded onto or transferred to data processing system 1300 for execution by processor unit 1304. Program code 1318 and computer-readable media 1320 form computer program product 1322 in these illustrative examples. In one example, computer-readable media 1320 may be computer-readable storage media 1324 or computer-readable signal media 1326.

In these illustrative examples, computer-readable storage media 1324 is a physical or tangible storage device used to store program code 1318 rather than a medium that propagates or transmits program code 1318. Alternatively, program code 1318 may be transferred to data processing system 1300 using computer-readable signal media 1326.

Computer-readable signal media 1326 may be, for example, a propagated data signal containing program code 1318. For example, computer-readable signal media 1326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for an improved point-in-time visualization system, the computer implemented method comprising:
   receiving, by a number of processors, a selection of a focal corporate entity from a user interface;
   if a focal corporate entity data relating to the focal corporate entity is in a memory, receiving from the user interface a focal point-in-time;
   if the focal corporate entity data is not in the memory, receiving, in response to an organizational query request, an organizational tree structure from the processors and loading the organizational tree structure into the memory;
   receiving from the user interface, after the loading of the organizational tree structure into the memory or if the corporate entity data is in the memory, the selected focal point-in-time;
   selecting records from the organizational tree structure, wherein the selected focal point-in-time falls between a start date and an end date of the records; and
   displaying to represent graphically, by the number of processors, the selected records from the organizational tree structure in the user interface.

2. The computer implemented method of claim 1, further comprising:
   determining, by the number of processors, entity change parameters relating to the selected records; and
   displaying, by the number of processors, the entity change parameters on the user interface.

3. The computer implemented method of claim 2, wherein a graphical representation of the entity change parameters filters the organizational tree structure to a particular point-in-time.

4. The computer implemented method of claim 2, wherein the entity change parameters are represented graphically by at least one of:
   a slider;
   a dial;
   a scrollbar;
   a number of buttons; or
   a wheel.

5. The computer implemented method of claim 2, wherein the entity change parameters comprise at least one of:
   an entity;
   a start date;
   an end date;
   a parent entity; or
   an ultimate parent entity.

6. The computer implemented method of claim 2, wherein the entity change parameters comprises data about at least one of:
   an entity being added to an organization;
   an entity being removed from the organization; or
   an entity being repositioned within the organization.

7. A computer program product for point-in-time visualization, the computer program product comprising:
   a computer-readable storage medium having program instructions embodied thereon to perform the steps of:
   receiving, by a number of processors, a selection of a focal corporate entity from a user interface;
   if a focal corporate entity data relating to the focal corporate entity is in a memory, receiving from the user interface a focal point-in-time;
   if the focal corporate entity data is not in the memory, receiving, in response to an organizational query request, an organizational tree structure from the processors and loading the organizational tree structure into the memory;
   receiving from the user interface, after the loading of the organizational tree structure into the memory or if the corporate entity data is in the memory, the selected focal point-in-time;
   selecting records from the organizational tree structure, wherein the selected focal point-in-time falls between a start date and an end date of the records; and
   displaying to represent graphically, by the number of processors, the selected records from the organizational tree structure in the user interface.

8. The computer program product of claim 7, wherein the program instructions perform the steps of:
   determining entity change parameters relating to the selected records; and
   displaying, the entity change parameters on the user interface.

9. The computer program product of claim 8, wherein a graphical representation of the entity change parameters filters the organizational tree structure to a particular point-in-time.

10. The computer program product of claim 8, wherein the entity change parameters are represented graphically by at least one of:
    a slider;
    a dial;
    a scrollbar;
    a number of buttons; or
    a wheel.

11. The computer program product of claim 8, wherein the entity change parameters comprise at least one of:
    an entity;
    a start date;
    an end date;
    a parent entity; or
    an ultimate parent entity.

12. The computer program product of claim 8, wherein the entity change parameters comprises data about at least one of:
    an entity being added to an organization;
    an entity being removed from the organization; or
    an entity being repositioned within the organization.

* * * * *